(12) United States Patent
Knauer

(10) Patent No.: US 9,707,839 B2
(45) Date of Patent: Jul. 18, 2017

(54) AIR INLET FOR A MOTOR VEHICLE

(71) Applicant: Magna Exteriors GmbH, Sailauf (DE)

(72) Inventor: Bernd Knauer, Stuttgart (DE)

(73) Assignee: MAGNA EXTERIORS GMBH, Sailauf (DE)

( * ) Notice: Subject to any disclaimer, the term of this patent is extended or adjusted under 35 U.S.C. 154(b) by 0 days.

(21) Appl. No.: 15/256,689

(22) Filed: Sep. 5, 2016

(65) Prior Publication Data

US 2017/0066319 A1    Mar. 9, 2017

(30) Foreign Application Priority Data

Sep. 3, 2015    (DE) .................. 10 2015 216 924

(51) Int. Cl.
    *B60K 11/08*    (2006.01)
(52) U.S. Cl.
    CPC ................................. *B60K 11/085* (2013.01)
(58) Field of Classification Search
    CPC ....... B60K 11/08; B60K 11/085; B60K 11/02; B60K 11/04
    See application file for complete search history.

(56) References Cited

U.S. PATENT DOCUMENTS

| 2013/0092463 A1 | 4/2013 | Hori |
| 2014/0045418 A1 | 2/2014 | Schneider |

FOREIGN PATENT DOCUMENTS

| DE | 10233408 A1 | 5/2003 |
| DE | 102013007158 A1 | 11/2013 |
| DE | 102012213992 A1 | 2/2014 |
| DE | 102012214474 A1 | 5/2014 |
| WO | 2014036432 A1 | 3/2014 |
| WO | 2015032990 A1 | 3/2015 |

*Primary Examiner* — John Walters
*Assistant Examiner* — James Triggs
(74) *Attorney, Agent, or Firm* — Jordan IP Law, LLC; Todd A. Vaughn

(57) ABSTRACT

Air inlet for a motor vehicle. The air inlet is to control the air to be supplied to a cooling device of an internal combustion engine, and includes a frame, at least one closing element, and at least one latching assembly to connect the at least one closing element to the frame so as to be pivotable about an axis of rotation of the closing element.

20 Claims, 3 Drawing Sheets

AIR INLET FOR A MOTOR VEHICLE

CROSS-REFERENCE TO RELATED APPLICATIONS

The present application claims priority 35 U.S.C. §119 to German Patent Publication No. DE 102015216924.3 (filed on Sep. 3, 2015), which is hereby incorporated by reference in its entirety.

TECHNICAL FIELD

Embodiments relate to an air inlet for a motor vehicle, in particular for controlling air to be supplied to a cooling device of an internal combustion engine.

BACKGROUND

Motor vehicle air inlets serve for controlling the warm-up behaviour of the engine in that the air flow, for example, to the heat exchanger. Such air inlets are controlled via adjustable closing elements. By closing the fresh-air supply during warm-up or by controlling the amount of cooling air in accordance with the engine temperature, the optimum operating temperature is reached more quickly or is kept within a desired temperature range.

Such closing elements are mounted on the front side of a vehicle such that its engine compartment can be tightly closed, the drag coefficient is improved in the closed position of the closing elements and the engine reaches its operating temperature more quickly.

A closing element of this type is known from German Patent Publication No. DE 10 2008 049 010. Its centrally arranged actuator serves for the oppositely directed pivoting movement of groups of lamellae arranged above one another. In order to pivot in the same direction a plurality of lamellae arranged parallel to one another, each of them has, at a distance from its pivot axis, a driver journal which is connected to a common coupling element. The pivoting drive takes place here by the direct coupling of the rotary axle of one of the lamellae to the output shaft of a stepping motor.

An advantage of this construction lies in the space-saving, central arrangement of the actuator within the frame and in the consequently symmetrical distribution of the adjusting force of the actuator to closing elements which are relatively short and thus subjected to relatively high loading by bending and torsion forces. Such forces arise not only as a result of the ram pressure on the vehicle front end or as a result of the effect of impact forces by impacting foreign bodies, but also as a result of the adjusting force of the actuator if some lamellae are sluggish due to contamination or have to be broken loose after freezing up.

German Patent Publication No. DE 10 2012 214 474 A1 discloses a controllable air inlet for a motor vehicle, wherein at least one closing element which is pivotable about a longitudinal axis is mounted at each of its free ends in a bearing receptacle. The free ends of the closing element are formed substantially as cylindrical journals, with the result that the at least one pivotable closing element is displaceable in the axial direction, within the component tolerances. In the case of high speeds of the vehicle and correspondingly large wind forces, there occurs flapping, rattling or even lifting of the pivotable element, which leads to undesired noise generation.

It is also possible to produce the air inlet as a composite structure consisting of plastic and metal in order to reduce flapping, rattling or lifting, but this leads to an undesired weight increase of the air inlet.

SUMMARY

Embodiments relate to a controllable air inlet for a motor vehicle in which the aforementioned disadvantages are reliably eliminated via simple measures and without additional weight increase.

In accordance with embodiments, an air inlet for a motor vehicle, in particular, an air inlet configured to control the air to be supplied to a cooling device of an internal combustion engine, comprises: a frame; at least one closing element arranged within the frame so as to be pivotable about an axis of rotation of the closing element; and at least one latching assembly to connect the closing element to the frame.

In accordance with embodiments, there is thus provision that the bearing play in an axial direction between the closing element and frame is minimized via the latching assembly.

Developments of the invention are specified in the dependent claims, the description and the appended drawings.

In accordance with embodiments, the latching assembly has substantially an extension and a receptacle. The extension is formed on a first end of the closing element. The extension on the closing element is formed substantially cylindrically along the axis of rotation, wherein the extension has a peripheral groove in an end region. The extension of the closing element has in its end region a cone point or similar geometry which is intended to facilitate latching of the extension with the receptacle, wherein the cone point is designed to adjoin the peripheral groove.

In accordance with embodiments, the receptacle is formed on the frame. The receptacle substantially comprises a through-bore for mounting the extension of the closing element. A latching lug is provided in the region of the through-bore, the latching lug being latched into the peripheral groove of the extension of the closing element.

The latching assembly thus formed thus reliably prevents displacement of the closing element in the axial direction.

In accordance with embodiments, the frame can be of multi-part design, in which the frame has a frame part and at least one side part connected to the frame part.

In accordance with embodiments, the closing element engages by the free second end in a side part connected to the frame part.

In accordance with embodiments, there is thus provision that the frame which is to receive the closing element to be pivotably mounted has at least one side part which is connected to the frame part and finally receives the closing element in a bearing manner.

In accordance with embodiments, the closing element has a second free end, wherein the second free end is formed along the axis of rotation as a substantially cylindrical journal.

In accordance with embodiments, the second free end of the closing element can be formed like the extension of the first free end. The side part also has a receptacle, with the result that the closing element is also latched in the side part.

In accordance with embodiments, the first free end and the second free end of the closing element form the axis of rotation of the closing element.

In accordance with embodiments, after inserting the closing element into the frame part, the side part is plugged onto said frame part and connected thereto. The closing element is inserted into the frame part with the side part removed, wherein mounting advantageously takes place without deformation of the frame and/or of the closing element.

In accordance with embodiments, by placing the side part on the frame part, the previously exposed second end of the closing element is seized in a receptacle or bearing opening of the side part and thus mounted permanently.

In accordance with embodiments, the side part is connected to the frame part by way of a latching device.

In accordance with embodiments, two side parts are provided for connection to the frame part, the side parts having a substantially mirror-symmetrical design as a left-hand part or right-hand part.

In accordance with embodiments, a plurality of closing elements are provided, wherein the closing elements are each pivotable about their respective axis of rotation in their respective receptacles of the frame.

In accordance with embodiments, the controllable air inlet is composed of plastic. The individual parts may be manufactured by an injection-moulding process.

In accordance with embodiments, the closing elements and the two side parts take the form of left-hand parts and right-hand parts which have a substantially mirror-symmetrical design about the Y-plane.

In accordance with embodiments, the closing elements are actuated electrically, wherein the actuating device is arranged in a housing of the frame part that is designed therefor.

In accordance with embodiments, the closing elements each also have an additional pin which is arranged at a defined distance from the axis of rotation and which serves for articulation of an actuating element.

DRAWINGS

Embodiments will be illustrated by way of example in the drawings and explained in the description below.

DESCRIPTION

Figure 1:
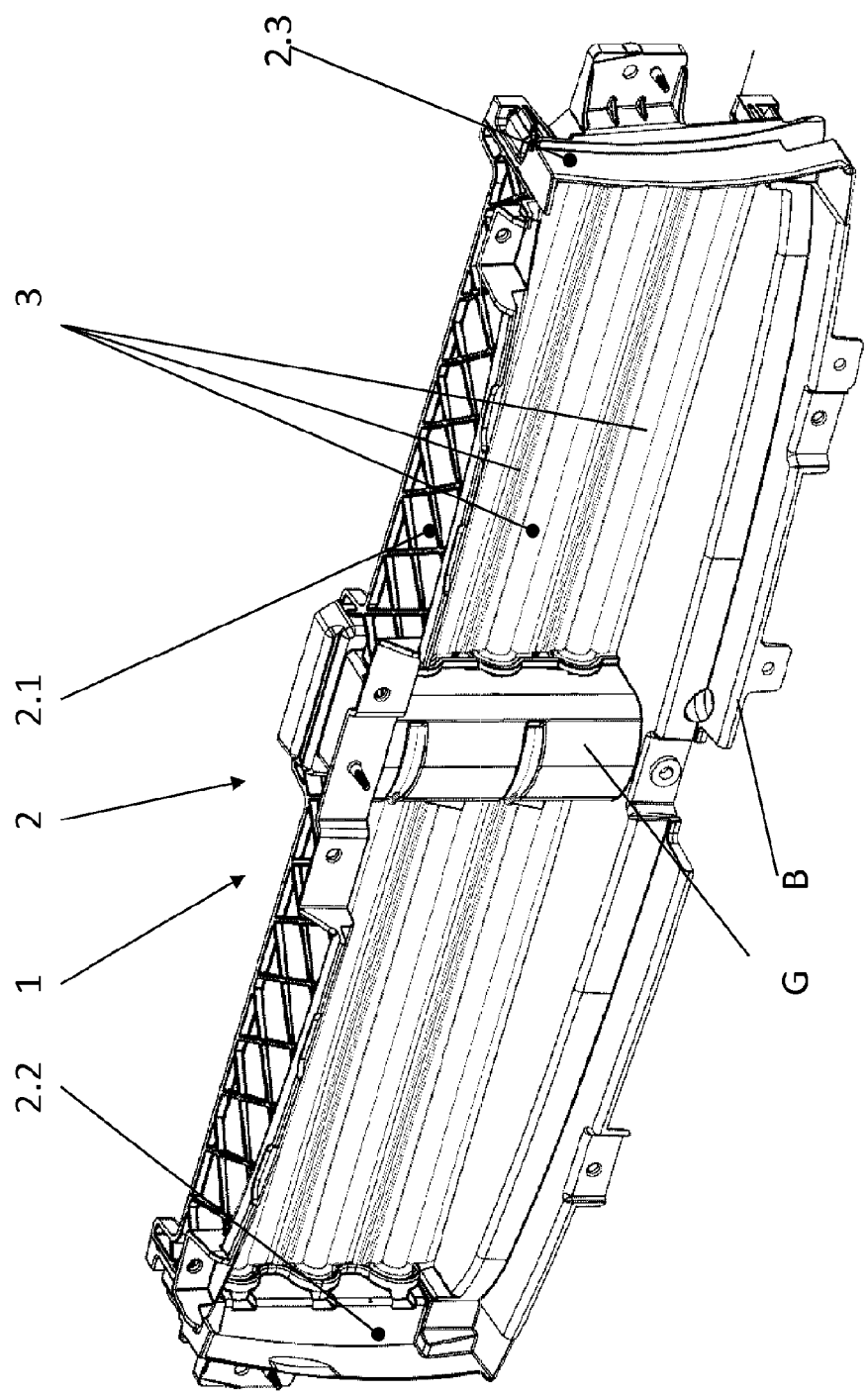
FIG. 1 illustrates a perspective view of an air inlet, in accordance with embodiments.
Figure 3:
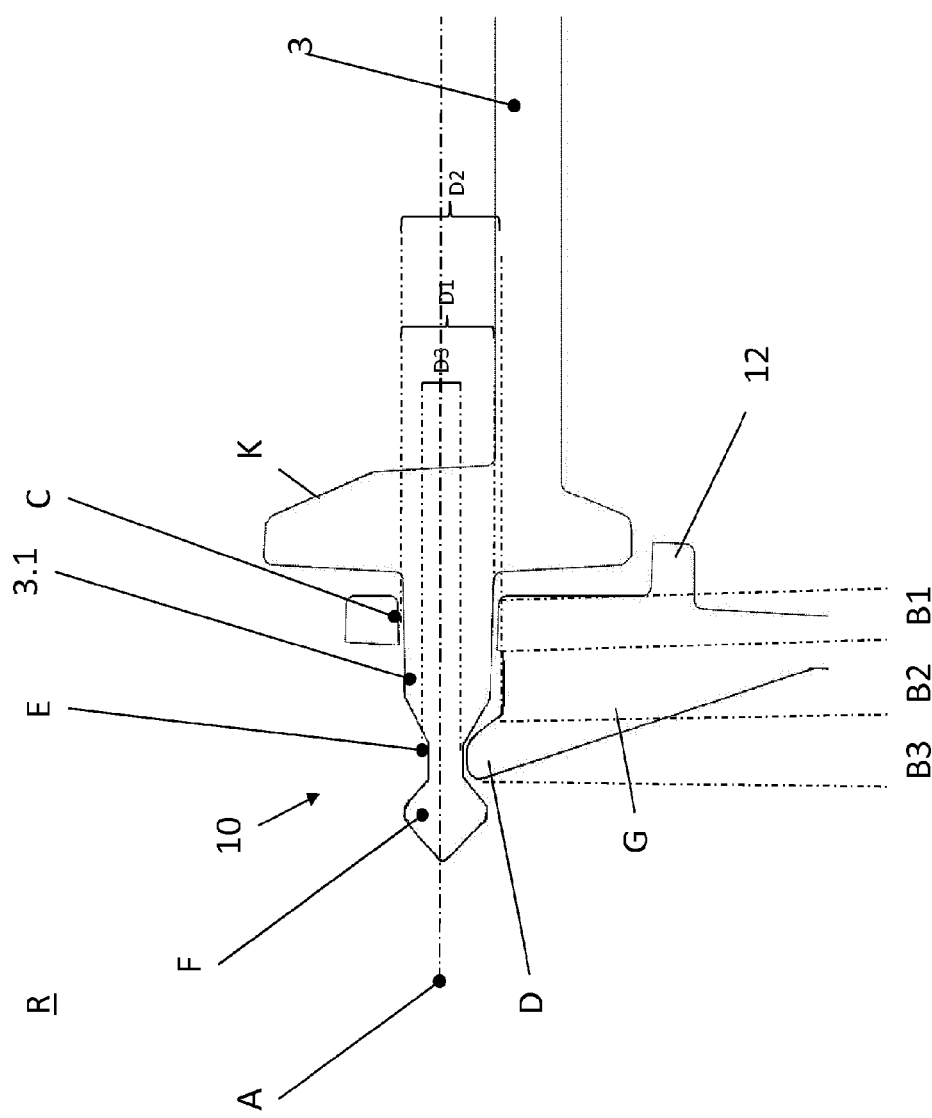
FIG. 3 illustrates a sectional view of the latching assembly, in accordance with embodiments.

As illustrated in FIG. 1, an air inlet 1 in assembled form is provided, in accordance with embodiments. The air inlet 1 comprises a frame 2 having a frame part 2.1 along the upper edge of the air inlet 1, and a pair of side frame parts 2.2, 2.3. These components are connected to one another by plugging and by screwing or similar connections, for example, latching connections 11, and are mounted on a base component B (FIG. 3). Provided centrally and at the mid-point of the component 2.1 is a housing for an actuator that is connected to the frame part 2.1 and connects the frame to the base component B. In the frame 2 there are arranged closing elements 3 which serve to control the quantity of air to a cooling device (not shown) of an internal combustion engine. The closing elements here are mounted both in the side parts 2.2 and 2.3 and centrally in the housing G of the actuator. The air inlet 1 is arranged behind a radiator grille (not shown) of a motor vehicle. For reasons of cost and weight, the air inlet or its components are made of plastic, preferably by an injection-moulding process.

Figure 2:
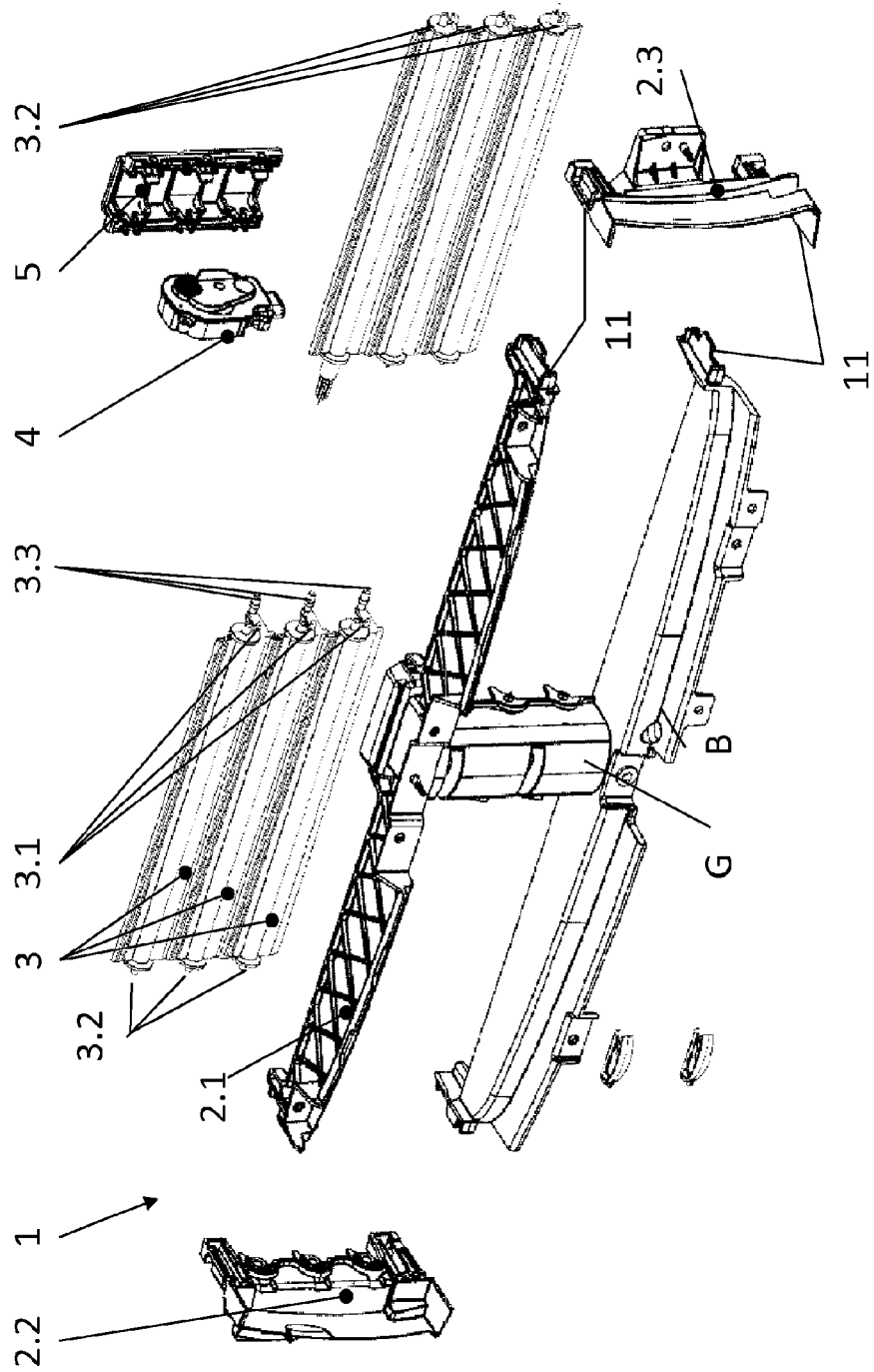
FIG. 2 illustrates an exploded view of the air inlet of FIG. 1 from the front.

As illustrated in FIG. 2, the air inlet 1 of FIG. 1 in an exploded illustration. Inserted below the frame part 2.1 is a plurality of closing elements 3 which are each pivotable about an axis of rotation A which corresponds to the longitudinal axis of the closing elements 3.

In accordance with embodiments, the closing elements 3 may be pivoted electrically via a drive or actuating unit 4. The actuating unit 4 is arranged in the housing G of the frame part 2.1 that is designed therefor, and which is drive-connected to a closing element 3 specially designed therefor. The drive unit 4 is installed in the housing G and actuates an actuating element 5 which closes off the housing G to the inside. The actuating element 5 has driving openings in which pins 3.3 provided therefor on the closing elements 3 are suspended. The actuating element 5 is designed as a unit which transmits tensile and thrust forces, and is correspondingly displaceably mounted outside the frame part 2.1 and the housing G in a vertical direction.

The additional pins 3.3 are suspended in the driving openings of the actuating element 5, with the result that a displacement of the actuating element 5 brings about a synchronous pivoting of the closing elements 3. The pins 3.3 are arranged at a defined distance from the respective axis of rotation A of the closing elements 3 and form the extensions 3.1. The closing elements 3 are pivoted when the actuating element 5 is displaced. The closing elements 3 each have an extension 3.1 at a first free end thereof which is directed towards the drive, unit 4. The extension 3.1 forms the axis of rotation A with a second free end 3.2 which may be configured as a journal. Alternatively, the second free end 3.2 can also be configured as an extension. The extension 3.1 is mounted in a receptacle of the housing G and forms with this receptacle the latching assembly R which is illustrated in detail in FIG. 3 and will be described. The closing elements 3 are connected to the frame, wherein the side parts 2.2, 2.3 are each connected to the second free ends 3.2 of the closing elements 3 and thereafter the frame part 2.1 completes the frame 2 by latching the side parts 2.2, 2.3.

As illustrated in FIG. 3, the latching assembly R is situated between the first end region of the closing elements 3 and the housing G. The latching assembly R substantially comprises a receptacle 10 and the extension 3.1. The receptacle 10 is formed on the frame part 2.1, more precisely on the housing G. The extension 3.1 is integrally formed on the closing element 3. The receptacle 10 has a through-bore C and a latching lug D formed in the region of the through-bore C. The through-bore has a diameter which corresponds to a first diameter D1 of the extension 3.1. The through-bore does not extend with the same diameter along the axis A but is widened to a larger diameter D2 after a first width B1. In this region, it is no longer necessary for the housing G to have an increased overall wall thickness.

As illustrated, the through-bore is limited to the width B1 on the upper side of the extension and the wall thickness is likewise only B1. In the lower region, however, the wall of the housing forms a reinforcement which leads to a thickening of the wall thickness up to an overall width of B1+B2+B3. In the region of the third width B3 there is formed a latching lug D which considerably reduces the imaginary diameter of the through-bore. This latching lug D has the form of an elevation in the edge region of the wall thickness widening of the housing G. It extends vertically upwards, in which the inclination directed towards the closing element forms an obtuse angle alpha and the course of the latching lug is slightly rounded off. After a flat course in which the latching lug D extends in a corresponding manner to the groove E, the outer flank of the latching lug D tapers down to wall thickness B1 of the housing G.

The extension 3.1 is received in a bearing-like manner in the through-bore C in the region of the width B1 and B3.

After a length L1, the extension 3.1 converges conically to a reduced diameter D2, with the result that it forms a peripheral groove E in the region of its end. To ensure that the groove is formed, the diameter of the extension 3.1 increases again. A cone point F is formed at the end of the extension 3.1 adjoining the peripheral groove E. This cone point includes a first region in which the diameter increases, and a second region in which the diameter is reduced to zero. This results in an end which tapers to a point or crown, and which facilitates the introduction of the closing element into the receptacles 10 and simultaneously serves for latching.

The latching lug D engages in the peripheral groove E, with the result that the closing element 3 and the housing are latched. The cone point F facilitates the latching of the latching lug D into the peripheral groove E when connecting the closing element 3 to the housing in the frame. Instead of a cone point F, it is also possible to use any other geometry which facilitates latching.

Guidance in the receptacle is managed by the through-bore and latching is managed by the cone point F moving over the latching lug. In addition, two further regions of the latching connection also serve for further guidance. The closing element 3 has a collar K which can also be used as a stop and prevents excessive forces being applied to the latching element, for example during mounting. The distance between the collar and the wall of the housing is selected here such that, in the event of contact, the extension 3.1 only exerts a force in the region of the inner flank of the latching lug but cannot press away the latching lug. Provided below the through-bore is a rib 12 which has guide functions and, when a downward vertical force is applied to the closing element, helps bend down the extension 3.1.

Embodiments may be implemented for any latching connection of a closing element of an air inlet on the motor vehicle.

In accordance with embodiments, the closing elements may be installed on both sides by the latching connection, or alternatively, only at one end of the closing elements. Depending on the structural design of the frame structure, the latching connection can be mounted in the central region on a housing, which can also only be a central connection between the frame part 2.1 and the base component B, or alternatively, on the side parts of the frame. It is also conceivable here that not all the closing elements, that is to say not all three closing elements in the example illustrated, are each latched by the same end. In accordance with embodiments, it is possible, for example, to latch the two outer closing elements at their ends directed towards the centre and, by contrast, to latch the central closing element on a side part, or vice versa. As a result, the receiving openings and through-bores and also the thickening of the wall thickness can be used more flexibly still and precisely the thickening of the wall thickness can be used to stiffen the plastic components.

The term "coupled," or "attached," or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Air inlet
2 Frame
2.1 Frame part
10 Receptacle
2.2, 2.3 Frame Side part
3 Closing element
3.1 Extension (first free end)
3.2 Journal (second free end)
3.3 Pin
4 Actuating unit
5 Actuating element
11 Latching device
12 Rib
A Axis of rotation
R Latching mechanism
C Through-bore
D Latching lug
E Peripheral groove
F Cone point
B Base component
B1, B2, B3 Widths
D1 D2 D3 Diameters
G Housing
K Collar

What is claimed is:

1. An air inlet to control air to be supplied to a cooling device of an internal combustion engine of a motor vehicle, the air inlet comprising:
   a frame;
   at least one closing element arranged within the frame so as to be pivotable about an axis of rotation; and
   at least one latching assembly to connect the at least one closing element to the frame, the at least one latching assembly including:
      a cylindrical extension of the at least one closing element, the extension having a reduced-diameter peripheral groove in an end region thereof, and
      a receptacle in the frame, an upper side of the receptacle having a maximum total length in a direction along the rotation axis that is greater than that of a bottom side of the receptacle.

2. The air inlet of claim 1, wherein the extension is formed on a first free end of the at least one closing element in a direction of the frame.

3. The air inlet of claim 1, wherein the receptacle comprises a through-bore to mount the extension of the at least one closing element.

4. The air inlet of claim 3, wherein the receptacle includes a latching lug provided adjacent the through-bore, and which is configured to be latched into the peripheral groove of the extension of the at least one closing element.

5. The air inlet of claim 1, wherein the frame comprises at least one frame part, and at least one side part connected to the at least one frame part.

6. The air inlet of claim 5, wherein the at least one closing element comprises a second free end formed along the axis of rotation as a substantially cylindrical journal.

7. The air inlet of claim 6, wherein the at least one closing element is to engage, via the second free end, in the side part connected to the at least one frame part.

8. The air inlet of claim 6, wherein a first free end of the closing element and the second free end of the at least one closing element form the axis of rotation.

9. The air inlet of claim 5, wherein the side part is parts are connected to the frame part by way of the latching assembly.

10. The air inlet of claim 1, wherein the air inlet is composed of plastic.

11. An air inlet for a motor vehicle, the air inlet comprising:
a frame;
a plurality of closing elements arranged within the frame; and
at least one latching assembly to connect the closing elements to the frame for pivotable movement about an axis of rotation, the at least one latching assembly including:
a cylindrical extension of the closing elements, the extension having a reduced-diameter peripheral groove in an end region thereof, and
a receptacle in the frame, an upper side of the receptacle having a maximum total length in a direction along the rotation axis that is greater than that of a bottom side of the receptacle.

12. The air inlet of claim 11, wherein the extension is formed on a first free end of the closing elements in a direction of the frame.

13. The air inlet of claim 11, wherein the receptacle comprises a through-bore to mount the extension of the closing elements.

14. The air inlet of claim 13, wherein the receptacle includes a latching lug provided adjacent the through-bore, and which is configured to be latched into the peripheral groove of the extension of the closing elements.

15. The air inlet of claim 11, wherein the frame comprises at least one frame part, and at least one side part connected to the at least one frame part.

16. The air inlet of claim 15, wherein the closing elements each comprise a second free end formed along the axis of rotation as a substantially cylindrical journal.

17. The air inlet of claim 16, wherein the closing elements are to engage, via the second free end, in side parts of the at least one side part connected to the at least one frame part.

18. The air inlet of claim 16, wherein first free ends of the closing elements and the second free ends of the closing element form axes of rotation including the axis of rotation.

19. The air inlet of claim 15, wherein side parts of the at least one side part are connected to the at least one frame part by way of the at least one latching assembly.

20. An air inlet for a motor vehicle, the air inlet comprising:
a frame;
at least one closing element arranged in the frame;
at least one latching assembly to connect the at least one closing element to the frame for pivotable movement about an axis of rotation, the at least one latching assembly including:
a cylindrical extension of the at least one closing element, the extension having a reduced-diameter peripheral groove in an end region thereof, and
a receptacle in the housing, an upper side of the receptacle having a maximum total length in a direction along the rotation axis that is greater than that of a bottom side of the receptacle; and
an actuating element arranged in the frame to electronically actuate the at least one closing element.

* * * * *